March 11, 1969     C. PETRIDES     3,432,735

SYNCHRONOUS MOTOR

Filed Jan. 21, 1966     Sheet 1 of 2

Inventor:
Christie Petrides
by Leonard J. Platt
Attorney

March 11, 1969  C. PETRIDES  3,432,735
SYNCHRONOUS MOTOR
Filed Jan. 21, 1966  Sheet 2 of 2
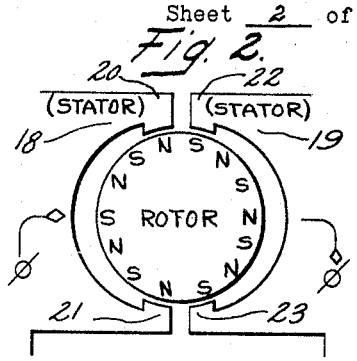
Fig. 2.
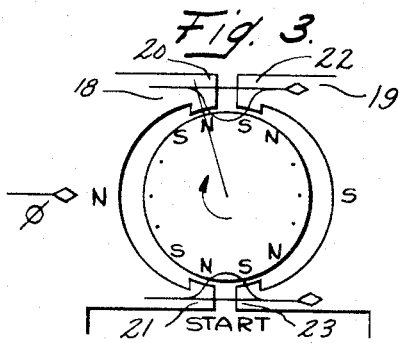
Fig. 3. START
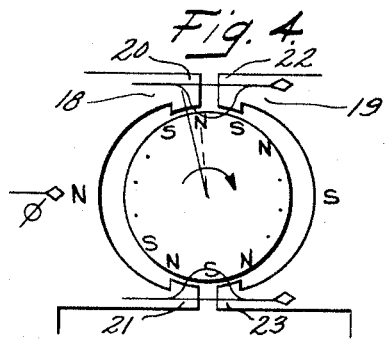
Fig. 4.
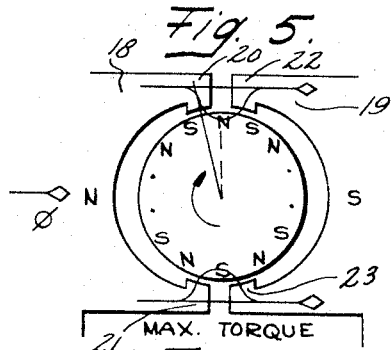
Fig. 5. MAX. TORQUE
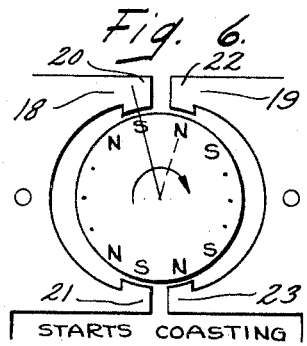
Fig. 6. STARTS COASTING
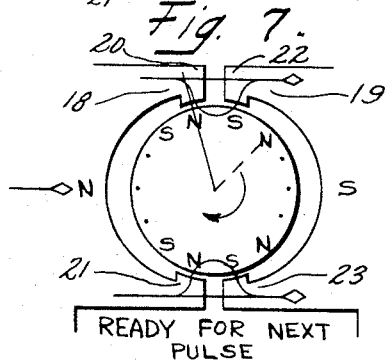
Fig. 7. READY FOR NEXT PULSE
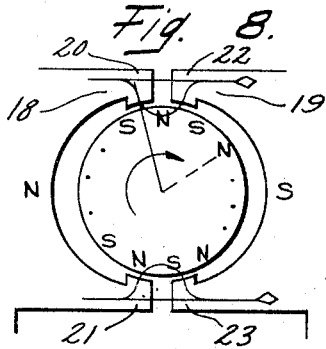
Fig. 8.
Inventor:
Christie Petrides
by Leonard J. Platt
Attorney United States Patent Office 3,432,735
Patented Mar. 11, 1969

3,432,735
SYNCHRONOUS MOTOR
Christie Petrides, Medway, Mass., assignor to General Electric Company, a corporation of New York
Filed Jan. 21, 1966, Ser. No. 522,129
U.S. Cl. 318—138    1 Claim
Int. Cl. H02k 21/26

ABSTRACT OF THE DISCLOSURE

A synchronous electric motor having a permanent magnet rotor including a plurality of alternately north and south poles, and torque takeoff gearing specifically positioned with respect to the force of gravity to achieve a motor having low operating noise.

---

This invention relates generally to synchronous motors and more specifically to general improvements in synchronous motors and control circuits therefor resulting in a more efficient, accurate, and relatively noiseless running motor.

Synchronous motors capable of low operating speeds and exhibiting relatively good efficiency, accuracy, and low operating noise levels are sometimes desirable in certain applications. One application in which such a synchronous motor is desirable is in a battery operated timing device such as clocks wherein extreme accuracy is required. A type of synchronous motor that has been developed for use in battery operated clocks comprises a permanent magnet rotor pulse driven synchronous motor in which a very low frequency pulse signal is applied to the stator winding of the motor rather than the normal AC sinusoidal signal. In one battery operated clock an electrical oscillator system, which includes the stator windings of the motor, supplies low frequency pulse signals to the motor at a rate which is synchronized with some type of very accurate timing means such as a mechanical oscillator. A system of this type is disclosed and claimed in my United States Patent 3,142,012, July 21, 1964, which is assigned to the assignee of the present invention.

In order to insure that the "Q" of the electrical oscillator remains relatively high so that accurately timed signals are presented to the motor, care must be taken to insure that the motor itself does not reflect spurious oscillations into the electrical oscillator due to the stator windings of the motor themselves acting with a capacitor starting means as a higher frequency oscillator. Another problem which may arise in such a system is that while the motor may operate at an average speed which is very accurately set to the desired synchronous speed, high frequency hunting modes may occur which, if left ignored, may increase to such a point that the motor may stop or run away. Finally, problems of noise occur which lessen the attractiveness of the clock as a commercial item. The present invention presents improvements in a permanent magnet pulse-type synchronous motor and circuit therefor in which the above-mentioned problems of the prior art are alleviated.

It is therefore an object of this invention to present a synchronous motor capable of accurate running at very low speeds.

It is another object of this invention to present a synchronous motor which is capable of operating at relatively low noise levels.

It is a further object of this invention to present a synchronous motor and a circuit therefor which has desirable starting characteristics and also insures a minimum of oscillatory action in the motor circuits.

It is still another object of this invention to present a synchronous motor and circuit therefor in which hunting modes are reduced to a minimum.

These and further objects of this invention are accomplished in a pulse-type synchronous motor including a permanent magnet rotor which is polarized at a relatively high number of poles so that its r.p.m. is relatively low thereby resulting in a reduction in operating noise. The noise level is further reduced by placing a torque takeoff gear for the rotor at a position on the periphery of the rotor shaft such that the force of gravity in the normal operating position of the rotor is perpendicular to the line of action between the torque takeoff gear and the rotor shaft. A resistor in series with a starting capacitor dampens out any stator oscillations and a resistor in series with the power supply to the motor reduces hunting modes in the motor.

The subject matter which is regarded as my invention is particularly pointed out and distinctly claimed in the appended claims. My invention, however, both as to its organization and method of operation, together with further objects and advantages thereof, may best be understood with reference to the following description taken in conjunction with the accompanying drawings in which:

FIGS. 2 through 8 show rotor and stator assemblies of a synchronous motor according to the teachings of this invention at various instances in time during its operation;

Figure 1:
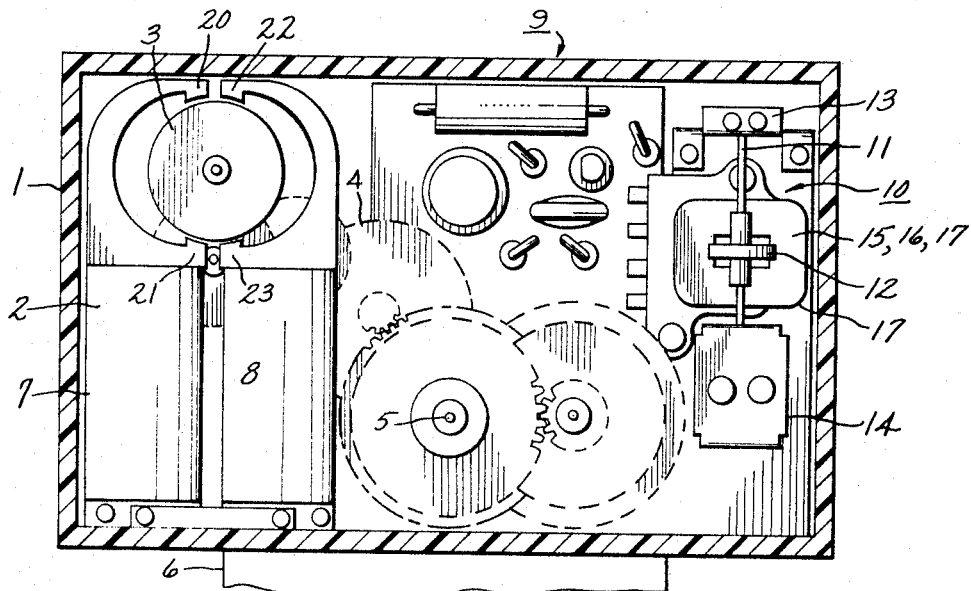
FIG. 1 shows an elevation view section of a battery operated clock showing the general components thereof.

Referring now to FIG. 1, a battery operated clock casing 1 is shown to include a pulse-type permanent magnet synchronous motor 2 having a rotor 3 which is coupled in driving engagement with a gear train 4 for driving a pair of clock hands (not shown) by means of a concentric shaft mechanism 5. The motor 2 is powered by means of a battery 6 and is excited and synchronized by electrical oscillations in its stator windings 7 and 8 which oscillations are supplied by means of an electromechanical oscillator comprising an electronic portion and a mechanical portion indicated generally by reference numerals 9 and 10 respectively. The mechanical portion 10 comprises a torsion member 11 to which a permanent magnet 12 is fixedly secured. The ends of the torsion member 11 are secured to a pair of support members 13 and 14. The torsion member 11 may comprise a flat wire which oscillates at a natural frequency depending upon its length between the support members 13 and 14 and upon the tension supplied thereto by tension adjusting means not shown. Oscillation of the torsion wire 11 causes the permanent magnet 12 to also oscillate thereby setting up an oscillatory magnetic field. A pair of coils 15 and 16 oppositely wound concentrically on a single core 17 are inductively coupled to the permanent magnet 12, the coils 15 and 16 being electrically connected in the electronic circuit 9.

The operation of the battery operated clock shown in FIG. 1 is generally as follows: the battery 6 energizes the electronic circuit 9 and the motor 2, and the torsion element 10 supplies synchronizing pulses to the electronic circuit 9 to maintain its output at a fixed frequency rate. An amplifier stage may be coupled to the output of the circuit 9 for delivering timing puses to the motor 2. While the specific circuitry and method of operation of the oscillators will be described hereinafter, suffice to say for the present that low frequency pulses are delivered to the stator windings 7 and 8 of the synchronous motor 2, and that these low frequency pulses are at an extremely accurate and fixed frequency rate. For purposes of illustration it will be assumed that a frequency rate of 30 cycles per second is the chosen frequency rate to drive the synchronous motor 2.

Referring to FIG. 2 there is shown a cross section of a rotor and stator assembly of a synchronous motor which transforms the timed electrical signals in the stator windings into rotary motion of the rotor for driving the clock hands. The rotor 3 is a permanent magnet which is polarized at points on its circumference with alternate north and south poles labeled N and S respectively. In order to achieve a relatively low rotational speed, a relatively high number of poles is desired. Additionally, for ease of manufacturing purposes, particularly in stamping operations, a number of poles is chosen so that half of this number is odd. For these and other reasons, in a preferred embodiment the number of poles was chosen to be 14 but this is by no means the only embodiment to which the teachings of applicant's invention are applicable. FIG. 2 further shows a pair of stator pole pieces 18 and 19 around which the stator coils 7 and 8 shown in FIG. 1 are respectively wound. The stator windings 7 and 8 are wound in the same direction and electrically connected in series so that the stator pole pieces 18 and 19 are polarized north and south respectively. The stator pole piece 18 includes two poles 20 and 21 oppositely disposed and the pole piece 19 includes similarly disposed pole pieces 22 and 23 which are positioned adjacent the poles 20 and 21 respectively. The stator assembly thus contains two north poles 20 and 21 and two south poles 22 and 23. In this design it is apparent that only four of the rotor poles out of the total number of fourteen in applicant's preferred embodiment are in magnetic relationship with the stator poles at any instant of time. This reduces the torque output that may be achieved if a higher number of stator poles were utilized. This type of design was chosen in order to reduce the reluctance forces in the motor, which reduction tends to reduce noise caused by bearing and gear mesh reactions. While a synchronous motor with a rotor and stator configuration as described would operate with a sinusoidal input in the stator coils, applicant has discovered that this particular configuration is especially desirable when a pulsating input is utilized. The input current to the stator windings 7 and 8 is therefore in the form of unidirectional pulses at some relatively low frequency rate such as thirty cycles per second. The electromechanical oscillator and amplifier circuits as generally described above which are needed to supply such an input current signal to the motor will be described in greater detail hereinafter.

By virtue of the fact that the current input pulses to the stator windings 7 and 8 are undirectional, the stator poles 18 and 19 become energized to the same polarities at all times. In the embodiment shown the stator pole 18 becomes energized to a north polarity while the stator pole 19 becomes energized to a south polarity. The stator poles thus fluctuate between de-energization and their respective polarities at the frequency rate of the input current signal, namely thirty cycles per second, in a preferred embodiment. Never does any one stator pole reverse itself in magnetic polarity due to the energization in the stator coils.

In the operation of the synchronous motor, reference is made to FIG. 3 which depicts the motor at an instant of time when a first magnetic pulse appears at the rotor through the stator pole pieces 20–23. Assuming that some provision has been made to start the rotor in the desired direction (in this embodiment chosen to be clockwise) and assuming further that the rotor is rotating at approximately its synchronous speed when it is in the position as illustrated in FIG. 3, a minimum torque force will be exerted on the rotor. The torque force on the rotor is at a minimum since the north poles of the stator piece 18 are directly across the air gap from a pair of north poles on the rotor 3. Similarly, the south poles 22 and 23 are directly across the air gap from a pair of south poles on the rotory 3. The inertia of the rotor 3 will carry it beyond the minimum torque point shown in FIG. 3 to a position indicated in FIG. 4 and the torque forces begin to increase. This is due to the fact that the line of action between the north and south poles of the stator and the rotor are now slightly off center. It will be apparent that the torque force due to the magnetic interaction between the stator and rotor poles will be such that a clockwise rotation is imparted to the rotor. The combination of the rotor inertia and the clockwise torque forces being applied on the rotor carry the rotor to a position indicated in FIG. 5. In FIG. 5 a north pole of the rotor is positioned directly between the north and south poles 20 and 22 respectively so that the respective repelling and attractive forces are almost horizontal. It will be apparent that in this position maximum torque is realized.

In all of the instantaneous positions indicated in FIGS. 3, 4, and 5, a current pulse is flowing through the stator windings so that the stator pole pieces 18 and 19 are magnetized. After the rotor passes through the point of maximum torque indicated in FIG. 5, it rotates to a position wherein the torque forces would tend to rotate the rotor in a counterclockwise direction if the stator pole pieces were still magnetized. However, at this point, indicated in FIG. 6, the current pulse in the stator windings 7 and 8 ceases so that the stator pole pieces become demagnetized thereby resulting in zero torque on the rotor. In this position the rotor is merely coasting due to its dynamic inertia and it continues to coast until it is in the position indicated in FIG. 7. This position is identical with the position indicated in FIG. 3 and in this postion the motor is ready to experience another current pulse. FIG. 8 shows the rotor in its maximum torque position at an angular displacement of two poles on the rotor from its position of FIG. 5. Thus, it is seen that the rotor rotates an angular distance equal to the distance between three successive poles on the rotor for each cycle of current in the stator windings. Therefore, the speed of the rotor is synchronized with the frequency of the current pulses. The formula to determine the RPM of the rotor shaft can therefore be expressed in terms of the frequency of the current pulses in the stator winding and the number of poles on the rotor. In the case where the number of poles is equal to fourteen and the frequency of the current signals is thirty cycles per second the synchronous speed of the rotor calculates out to be $257\frac{1}{7}$ revolutions per minute. This r.p.m. is relatively low thereby tending to reduce noises which would result from high velocity moving parts such as gear trains.

Figures 9, 10:
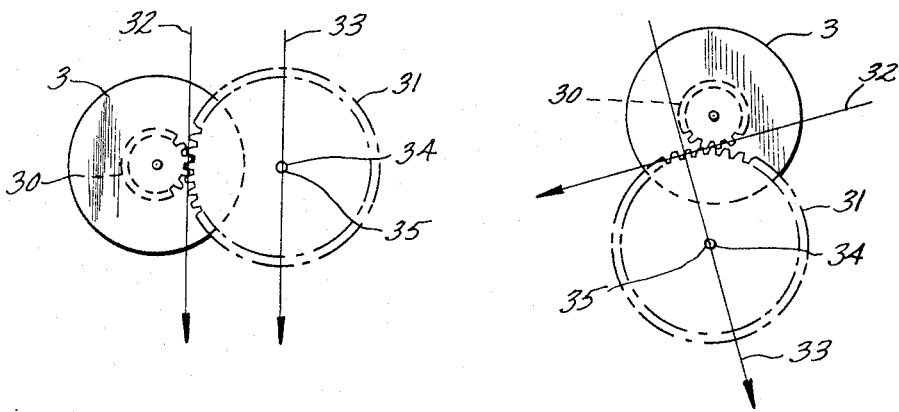
FIGS. 9 and 10 show gearing arrangements according to prior art and further teachings of this invention respectively for taking off power from the motor rotor.

In order to transform the revolutions of the rotor shaft into correctly timed rotations of clock hands or some other time indicating device, a gear and pinion arrangement is employed. FIG. 9 shows a section view of a typical prior art rotor torque take-off gear and pinion arrangement. The rotor 3 is shown to include a toothed pinion 30 in driving engagement with a gear wheel 31 which may be coupled to a gear train (not shown) for driving the clock hands. In most clocks the motor will be placed in only one position with respect to the force of gravity so that a line of action 32 between the pinion 30 and gear 31 is always in the same direction with respect to the force of gravity represented by an arrow 33 drawn through a hub 34 of the gear 31. In the prior art arrangement of FIG. 9 it will be noted that the line of action 32 is parallel or approximately parallel to the force of gravity 33. It has been observed that the rotor 3 tends to hunt at a high frequency rate during the period of time of rotation between any two successive poles on the permanent magnet rotor 3. These "hunting modes" are natural in a permanent magnet type motor and can never be completely eliminated although a means for their suppression will be more fully described hereinafter. Hunting modes tend to set up oscillations in the rotor shaft which cause vibrations to occur between the pinion 30 and the gear 31. These vibrations are transferred to the hub 34 which then rattles on its pivot 35 causing objectionable noise. A major proportion of this noise has been found to the due to the hub 34 being lifted and dropped on the pivot 35.

Referring now to FIG. 10, it will be noted that the rotor pinion 30 has been moved around the gear wheel 31 so that the rotor pinion 30 engages the teeth of the gear wheel 31 at a point somewhere near the top section of the gear wheel 31. The line of action between the pinion and the gear shown by the arrow 32' is now not parallel to the force of gravity shown by the arrow 33, but rather is more nearly perpendicular to it. In this configuration the oscillating motion of the rotor pinion 30 tends to cause the hub 34 of the gear wheel 31 to move from side to side on the pivot 35 rather than up and down as in the configuration of FIG. 9. This side to side motion tends to smooth out the oscillating motion of the rotor pinion 30 since the action of gravity has very little effect on it. Applicant has observed that the noise level created by the hunting modes of the rotor 3 is much lower when the pinion and gear arrangement is positioned in the configuration of FIG. 10 than in any other configuration in which they might be placed.

Figure 11:
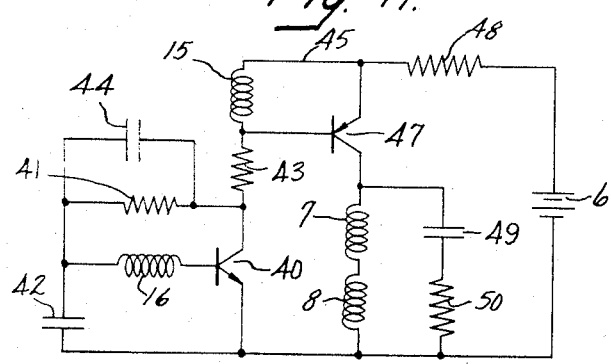
FIG. 11 shows an electronic circuit for delivering timing pulses to the motor which includes further teachings of this invention.

The electronic circuit for supplying driving pulses to the synchronous motor is illustrated in detail in FIG. 11 together with further teachings of the present invention. In FIG. 11 the electrical circuit 9 includes an oscillator transistor 40, the base electrode of which is connected to the electric coil 16 which, as stated previously, is positioned in inductive relationship with a permanent magnet member on a mechanical oscillating member. For purposes of ease of illustration, the mechanical member 10 depicted in FIG. 1 is not shown in FIG. 11. The oscillator transistor 40 is self-biased near its saturated region by means of a resistor 41 connected between its collector electrode and the side of the coil 16 opposite that connected to the base electrode. The emitter electrode of the transistor 40 is connected to one side of a DC blocking capacitor 42, the other side of which is connected to the side of the coil 16 opposite that connected to the base electrode. The collector electrode of the transistor 40 is connected also to a load resistor 43, the other side of which is connected to one side of the electric coil 15 which is also coupled in inductive relationship with the permanent magnet mounted on the mechanical member as described previously. In order to prevent very high frequency oscillations from occurring due to the mutual coupling between the coils 15 and 16, a high frequency bypass capacitor 44 is connected between the collector electrode of the transistor 40 and the side of the coil 16 opposite to that connected to the base electrode of the transistor 40. The battery 6 supplies power to the electronic circuit 9 over a pair of supply conductors 45 and 46.

In the operation of the electronic circuit 9 as thus far described, the transistor 40 is biased near its saturated region by the resistor 41 and is set into oscillations by means of the signals induced in the electric pickup coil 16 by the mechanical member 10. The oscillations of the transistor 40 carry it further into its saturation region and then out of it during a complete cycle. A portion of the output signal of the transistor 40 is fed back by means of the drive coil 15 to the mechanical member to sustain its oscillations. The electronic circuit 9 as described supplies electric pulses in the load resistor 43 and coil 15 at a frequency rate which is accurately timed by the natural frequency of the mechanical member 10.

Another portion of the signal in the load resistor 43 and coil 15 is coupled to the base electrode of an amplifier transistor 47. The transistor 47 is biased into and out of conduction alternately at a frequency rate equal to the frequency rate in the load resistor 43. Therefore, a pulse output signal is present at its collector electrode which is coupled to the stator windings 7 and 8 of the synchronous motor 2. The side of the stator windings 7 and 8 opposite that connected to the collector electrode is connected to the negative terminal of the battery 6 and the positive terminal of this battery is fed through a resistor 48 to the emitter electrode of the transistor 47. The series combination of a capacitor 49 and a resistor 50 are connected in shunt relationship with the stator windings 7 and 8 of the synchronous motor 2. The electronic circuit 9 together with the amplifier stage as just described is more distinctly described and claimed in a copending application to Jones, Ser. No. 522,290, filed Jan. 21, 1966, assigned to the assignee of the present invention.

In order to provide suitable starting torque for the synchronous motor 2, the capacitor 49 is inserted in shunt with the stator windings 7 and 8 so that the motor circuit is tuned at a frequency which is close to the frequency of the driving signals. It has been found, however, that the magnitude of the capacitance needed to tune the coils at the frequency used in the preferred embodiments, namely thirty cycles per second, is relatively high thereby requiring a large size, expensive capacitor. The use of a smaller size capacitor alone would cause the motor circuit to ring thereby feeding back undesirable oscillations into the electronic circuit 9. In order to provide suitable starting torque but also to cut down on the size of shunt capacitor 49 necessary, applicant has discovered that a resistor 50 placed in series with the capacitor 49 yields these desired features.

The resistor 50 and capacitor 49, in a preferred embodiment, are 1,000 ohms and one microfarad respectively. It was discovered by applicant that in this embodiment without the use of the 1,000 ohm resistor, in order to achieve sufficient starting torque, a five microfarad capacitor was necessary. It was also discovered that if a smaller size, and therefore less expensive, capacitor were used without the 1,000 ohm resistor, the circuit including the capacitor and the motor coils would ring thereby feeding back undesirable oscillations into the oscillator circuit 9. Also rate variations of the oscillator circuit may occur due to any torque variations in the motor. The combination of the one microfarad capacitor and 1,000 ohm resistor was discovered to eliminate ringing and rate variations while utilizing a relatively small size capacitor to achieve sufficient starting torque.

In the operation of the permanent magnet motor and oscillator circuit of FIG. 11, the average velocity of the motor is relatively accurate and is usually maintainable at its desired synchronous speed. However, it was noted that a circuit similar to that of FIG. 11 but without the resistor 48 inserted between the battery 6 and the emitter electrode of the transistor 47, very high frequency hunting modes may occur in the permanent magnet motor which tend to cause it to operate on the verge of instability. While normally these hunting modes do not affect the synchronous or average speed of the motor, should they become so severe that the instantaneous speed of the motor deviates substantially from the average speed, instability may result causing the motor to stop or to run away. In order to eliminate this instability, the hunting modes in the motor are electrically damped by the insertion of some negative feedback into the circuit proportional to the amount of motor current being drawn. This negative feedback is achieved by coupling the motor power supply back to the input circuit of the motor amplifier transistor 47 by means of the stabilizing resistor 48. In the operation of the stabilizing resistor 48, when the rotor is out of phase with the driving force caused by current pulses in the stator coil windings 7 and 8, a large current is drawn by the motor coils from the amplifier transistor 47 thereby dropping some of the applied voltage to the motor across the stabilizing resistor 48. This causes a reduction in the voltage across the motor which results in a lowering of the driving force applied to the motor. This causes the rotor to reduce its hunting modes or its high frequency oscillations and to fall in step with the applied driving force. In a preferred embodiment, a 68 ohm resistor used as the stabilizing resistor 48 was found to be optimum.

While the permanent magnet motor and gearing arrangement and the control circuits used to electrically operate the permanent magnet motor have been described in preferred embodiments, it should be understood that various modifications and other arrangements will be obvious to those skilled in the art. Thus, it is not intended that applicant be limited to the embodiment described but rather should be entitled to the full scope of the appended claims.

What I claim as new and desire to secure by Letters Patent of the United States is:

1. A synchronous motor and torque take-off gearing arrangement therefor including, a permanent magnet rotor including a plurality of alternately north and south poles disposed around the periphery thereof,
   (b) a pair of stator pole pieces, each including at least on pole in close magnetic relationship with said rotor,
   (c) a pair of stator coils respectively wound on said pair of pole pieces,
   (d) a rotor shaft fixedly secured to said permanent magnet rotor,
   (e) a pinion gear fixedly secured to said rotary shaft for rotary motion therewith,
   (f) a gear wheel adapted to make gearing contact with said pinion gear, said gear wheel being positioned with respect to said pinion gear such that a line of action tangent to said gear wheel through the point of contact between said gear wheel and said pinion gear is substantially perpendicular to a line of action representing the force of gravity,
   (g) an electromechanical oscillator for supplying accurately timed unidirectional electrical pulses to said pair of stator coils for periodically energizing said pole pieces to impart rotary motion to said rotor,
   (h) a capacitor connected in shunt with said pair of stator coils to provide starting torque to said motor,
   (i) a resistor connected in series with said capacitor to dampen oscillations occurring between said capacitor and said stator coils,
   (j) a unidirectional power supply connected to said motor, and
   (k) a resistor connected in series with said power supply for electrically damping hunting modes in said synchronous motor.

References Cited
UNITED STATES PATENTS

| | | | |
|---|---|---|---|
| 2,874,809 | 2/1959 | Poole | 310—164 |
| 2,985,778 | 5/1961 | Fritz | 310—164 X |
| 3,032,670 | 5/1962 | Fritz | 310—164 |
| 3,214,662 | 10/1965 | De Wolf | 318—138 X |
| 3,250,066 | 5/1966 | Engelhardt et al. | 318—138 X |
| 3,287,569 | 11/1966 | Carney | 318—138 X |
| 3,365,636 | 1/1968 | Baker | 313—138 |
| 3,375,423 | 3/1968 | Mayer et al. | 318—138 |

ORIS L. RADER, *Primary Examiner.*

G. R. SIMMONS, *Assistant Examiner.*

U.S. Cl. X.R.

310—99, 162

PO-1050
(5/69)

UNITED STATES PATENT OFFICE
CERTIFICATE OF CORRECTION

Patent No. 3,432,735　　　　　　　　　　　Dated March 11, 1969

Inventor(s)　　　　　　Christie Petrides

It is certified that error appears in the above-identified patent and that said Letters Patent are hereby corrected as shown below:

Column 7, line 20, "on" should read -- one --; line 26, "rotary" should read -- rotor --.

SIGNED AND
SEALED
DEC 23 1969

(SEAL)
Attest:

Edward M. Fletcher, Jr.
Attesting Officer

WILLIAM E. SCHUYLER, JR.
Commissioner of Patents